June 28, 1955 — B. M. BAKER — 2,711,649
TEMPERATURE INCREMENT DRIVE MECHANISM FOR PRESSURE RECORDERS
Filed Dec. 18, 1950 — 2 Sheets-Sheet 1
Fig. 1.  Fig. 2.  Fig. 3.  Fig. 4.
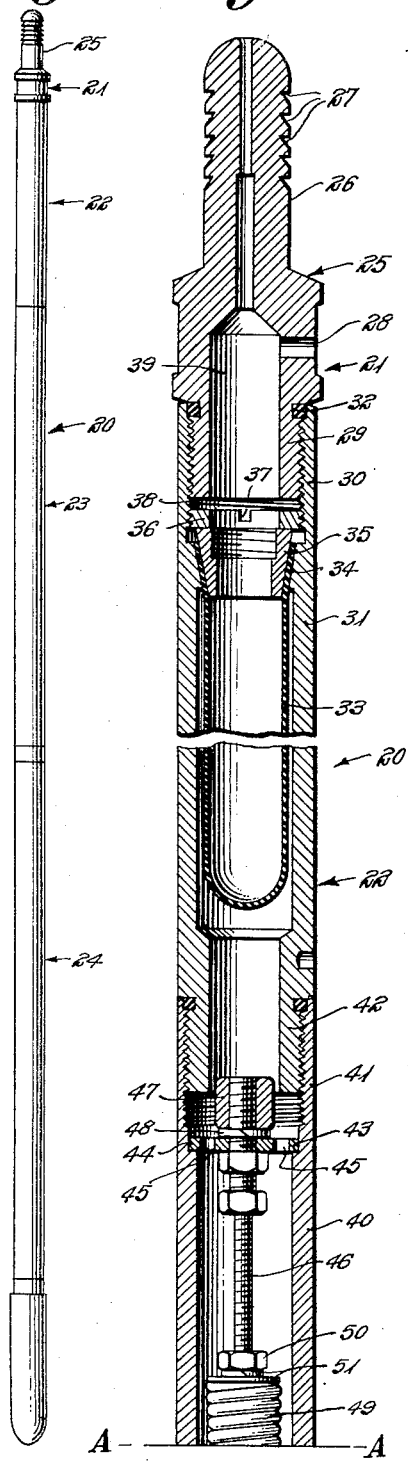
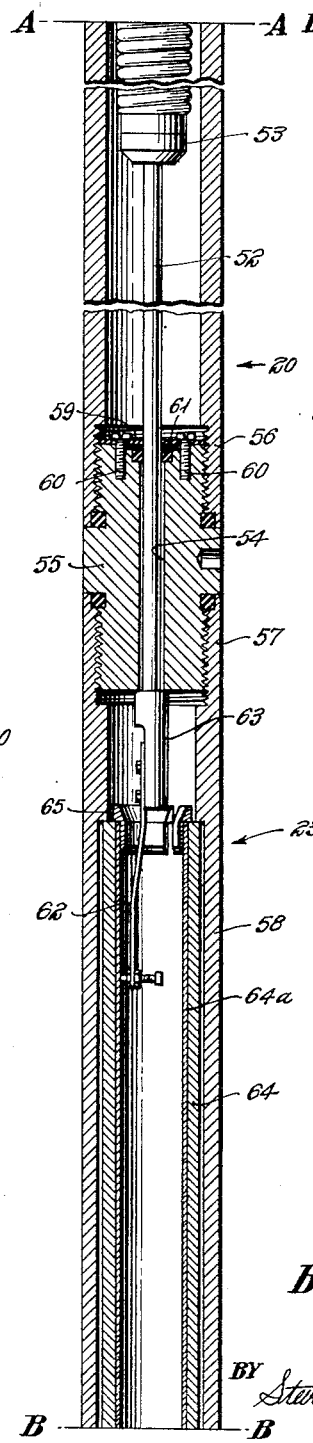
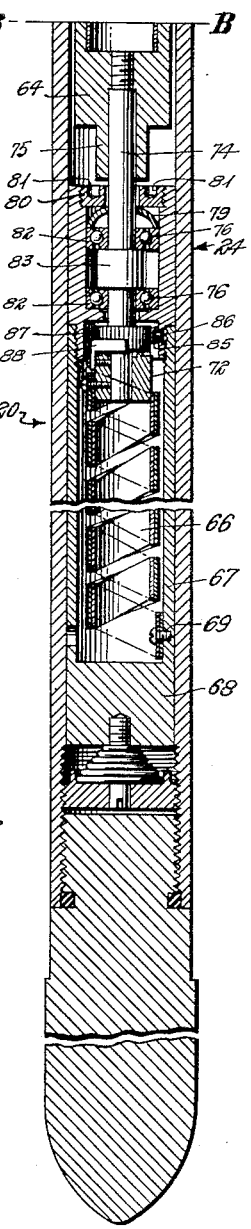
INVENTOR
Buford M. Baker
BY
ATTORNEYS

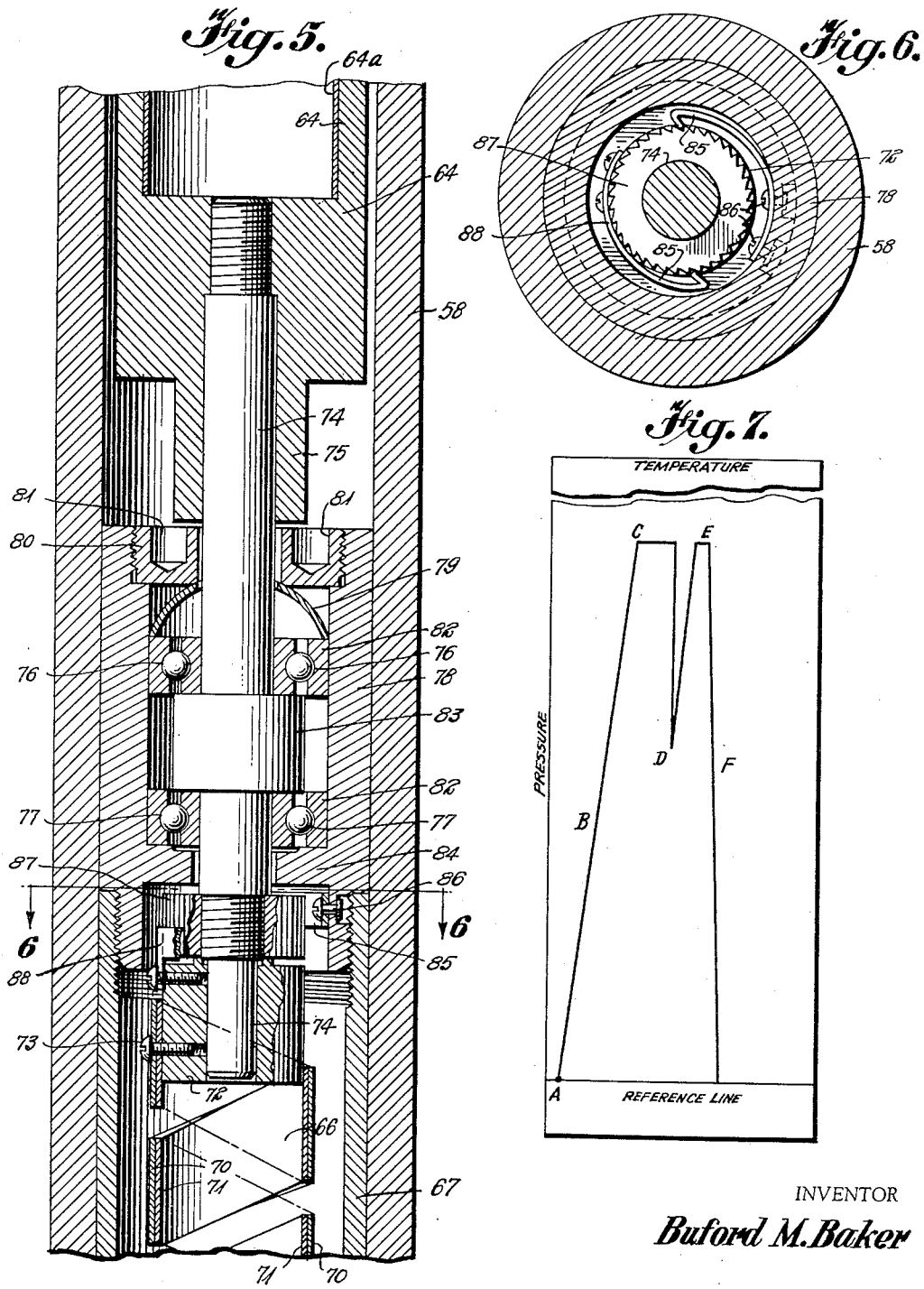

United States Patent Office 2,711,649
Patented June 28, 1955

2,711,649

TEMPERATURE INCREMENT DRIVE MECHANISM FOR PRESSURE RECORDERS

Buford M. Baker, Garland, Tex., assignor to Engineering Laboratories, Incorporated, Tulsa, Okla., a corporation of Oklahoma Application December 18, 1950, Serial No. 201,320

5 Claims. (Cl. 73—155)

This invention relates to an instrument for measuring pressure and more particularly to an instrument for measuring and recording the pressure at various depths in a bore hole.

In the oil industry it is extremely important to know the pressure that exists at any particular depth in a bore hole and particularly at that depth occupied by the oil pool, the pressure at this point being known as the bottom-hole pressure. The advantage of knowing this bottom-hole pressure, or more particularly the pressure at the level of the oil, is that from it the optimum rate of flow as well as the oil reserve can be calculated. Previously these pressures have been measured in the following manner. An elongated capsule, usually less than two inches in diameter, was lowered by a cable into the bore hole. The capsule contained a pressure-sensitive device such as a "Bourdon tube" which device was connected to a stylus. The stylus was mounted to record on a chart the pressure indications. The chart was usually in the form of a sheet of paper wrapped on the inside surface of a recording drum. This recording drum was caused to rotate by a clock mechanism. The amount of cable that was payed out in lowering the instrument itno the bore hole was recorded at the surface. The resulting chart showed a curve of pressure versus time. This is then coordinated with time versus depth information obtained at surface and thus pressure versus depth information is obtained. Usually the instrument was lowered to the bottom of the bore hole, the pressure recorded, and the instrument then raised a number of feet above the bottom and rested for a while. It was then lowered again to the bottom and a check on the first reading of pressure was obtained. The instrument was then returned to the top.

In such systems the ability of the clock to rotate the drum under extremely high temperatures was an important factor. A clock, as is well known, is constructed of a number of delicate members, all of which must be adequately lubricated to insure efficient performance of the clock. Difficulty was experienced quite often when using clocks in operations of the instant nature due to the thinning of the lubricant when the instrument was lowered to very great depths and the temperature accordingly reached high levels. This is particularly true in present day recordings where the bore holes are drilled to extreme depths and the temperatures are of the order of 400° F. When the oil thins, the elements of the clock do not receive good lubrication and the result is breakage of the springs and other delicate parts in the clock.

With the advent of a type of oil derived from the silicones, this problem of high temperature lubrication was to some extent relieved, with, however, the coincidental arrival of one major disadvantage. This disadvantage lay in the fact that these oils had very poor low temperature characteristics. In seasons when the atmospheric temperature is extremely low, the poor low temperature characteristics of these oils as lubricants for the elements of the clock rendered the clock inoperative during a large period of the descent of the instrument into the bore hole or until the clocks were independently warmed up prior to the start of the run.

It is an object of this invention to provide an instrument for measuring either temperature or pressure in a bore hole which is not subject to the limitations due to the temperature characteristics of the oil which lubricates the elements of the mechanism used to rotate the recording drum.

More particularly, it is an object of this invention to provide an instrument whose recording drum is rotated by an element, not a clock, which is responsive to either the temperature or the pressure in the bore hole and whose stylus for recording on the drum is operated by the element not used to rotate the recording drum, that is the temperature or pressure responsive element as the case may be.

The present invention contemplates in one form an instrument that includes a rotating recording drum mounted within the housing of the instrument, which drum is operated in one direction only by a temperature-responsive element such as a thermostat made of two strips of metal, both of different coefficients of thermal expansion. In another form the rotating drum is operated by a pressure-responsive device. In either case, the instrument includes a temperature-responsive device and a pressure-responsive device, one of which is used to rotate the recording drum and the other to operate the stylus. The stylus which is to record the pressure or temperature measurements is mounted in a sensitive fashion to the rotating drum in a manner to produce a continuous record on a recording sheet mounted to the recording drum.

For the purpose of more specifically describing the present invention, the one form including a pressure-responsive device to operate the stylus and a temperature-responsive device to operate the recording drum will be illustrated. In this form, as the instrument is lowered into the bore hole both the temperature and the pressure increase. The increase of temperature expands the thermostatic elements and rotates the drum. The expansion of the thermostatic elements is converted into rotary motion of the drum by forming these elements into a helix within the housing and connecting said helix to the drum at one end and to the housing at the other end. The increase of pressure manipulates the stylus and makes a recording on a strip attached to the drum. The depth to which the instrument is lowered is independently recorded at the surface of the earth.

When the instrument has reached its lowest point in the bore hole, the pressure and temperature no longer increase although the drum may continue to rotate for a short period of time due to the lag of the thermostatic elements behind the actual temperature at that particular level in the bore hole. This is due to the fact that the temperature changes must be experienced by the mass of metal constituting the housing before such changes are realized by the thermal elements. According to the procedure now in use, the instrument is then raised a certain number of feet in the bore hole and allowed to rest for a short period of time. During this time the temperature and the pressure decrease. As was heretofore mentioned, the drum is mounted for rotation in one direction only by any means, such as a ratchet, and can move only during increasing temperatures. The stylus, which is pressure-responsive, can move during both increasing and decreasing pressures. The reason for these particular features will be explained at a later point. When the instrument has rested a while at its raised position, it is again lowered, the temperature and pressure increasing, the stylus moving in response to the increase in pressure and the rotating drum moving in response to the increase in temperature. The instrument is lowered to the bottom of the bore hole and a check of the bottom-hole pressure obtained. The instrument is then returned to the surface.

This is the general operation of the instrument and it is quite obvious that the temperature-responsive device may be connected to the stylus and the pressure-responsive device may be connected to rotate the drum. The operational principle is exactly the same and a recording of the temperature at any particular level in the bore hole is thereby obtained.

Broadly, then, this invention contemplates an instrument for recording certain phenomena in bore holes such as temperature and pressure, said instrument including two phenomena-sensitive elements, one to rotate the recording drum and the other to operate the recording stylus for recording on the drum the phenomena to be measured, said drum being limited to a single direction of rotation.

Other and further objects of the invention will be apparent from the following description of the drawings:

Figure 1 is a front elevation of the instrument as contained in the capsule;

Figure 2 is a fragmentary cross-sectional view of the upper part of the instrument;

Figure 3 is a continuation of Figure 2 showing the middle portion of the instrument;

Figure 4 is a continuation of Figure 3 showing the lower part of the instrument;

Figure 5 is an enlarged fragmentary cross-sectional view of a part of Figure 4;

Figure 6 is a view taken along the line 6—6 of Figure 5; and

Figure 7 is a plan view of the record made by the instrument on a strip of recording material.

As shown in Figure 1, the instrument generally designated in this figure by numeral 20 is usually contained in a long capsule-like device made in various sections for easy assembly and disassembly. A cable is attached to the top portion of the capsule and the cable in turn runs to the surface and there is mounted upon a winch or the like, which winch includes means to read the amount of cable payed out in any particular time and consequently determines the depth at which the capsule is located in the bore hole.

With reference next to Figures 2 to 4, inclusive, the capsule 20 is shown in fragmentary fashion with a detailed disclosure of the parts thereof. The capsule is divided into four main sub-assemblies. The first sub-assembly 21 may be called the pressure unit. This unit receives fluid from the bore hole and the pressure thereof is sensed by the second sub-assembly 22 which may be called the pressure-sensitive unit. This latter unit responds to the pressure of the fluid in the pressure unit 21 and conveys its response to the third sub-assembly, the recording unit 23. The recording unit 23 records the responses of the pressure-sensitive unit 21 and is operated in turn by the temperature-responsive unit 24.

In greater detail now, still referring to Figures 2 to 4, the pressure unit 21 is composed of a cap 25 having a top portion 26 of reduced diameter. This top portion 26 has a plurality of annular grooves 27 which receives an attachment for a cable. The cable as previously mentioned is for the purpose of lowering the capsule into the bore hole. The middle portion of the cap has an opening 28 to admit to the instrument the fluid in the bore hole. The lower portion of the cap has a threaded nipple 29. This nipple 29 engages in a threaded sleeve 30 of a housing 31. An O-ring 32 is provided between the nipple 29 and the sleeve 30.

Before the cap 22 is engaged in the housing 31, the pressure-sensitive unit 22 is first put into place. A sack 33 is placed in position as shown in these figures, particularly in Figure 2. The sack is held at its upper end between a slanting shoulder 34 of the housing 31 and a conically shaped ring 35. This ring 35 is forced downwardly until the sack 33 is held firmly against the shoulder 34 by wedging the ring 35 as tightly as possible against the shoulder. To hold the ring in position the ring 36 is provided. This ring threadedly engages the threaded sleeve 30 of the housing 31 and is pressed against the ring 35 by placing a screw-driver in the slots 37 provided on the ring 36. With the ring 35 in final position, there is usually a space 38 left between the nipple 29 and the ring 35.

With the sack held in this position, the cap is threaded to the sleeve 30. A fluid enters the opening 28 into the cavity 39 within the cap and passes through the ring 36 and the ring 35 into the sack 33. The sack is preferably made of rubber but may be made of any flexible, impervious material to retain the fluid from the bore hole within the sack. As the pressure in the bore hole increases the sack, being flexible, expands. The energy of expansion is transmitted to a recorder in the following manner.

With the sack in position as above-described, the remaining parts of the pressure-sensitive unit 22 are connected in place. These remaining parts consist of a housing 40 having a threaded sleeve 41 in its upper end to receive a threaded nipple 42 extending downwardly as part of the housing 31. A shoulder 43 is formed between the housing 40 and the sleeve 41 on the inner surface of the said housing. On the shoulder rests a disc 44 having a plurality of apertures 45 therein. To the disc 44 is mounted a rod 46. The rod extends usually through the disc and is threaded at its top and secured to the disc by a means such as a nut 47 and a washer 48.

To the lower end of the rod is mounted a coil-spring 49 normally in compressed attitude. As shown, this mounting is accomplished with the assistance of a nut 50 and a washer 51. To the lower end of the coil spring 49 is mounted a piston rod 52, by means such as 53. This piston rod 52 passes through a channel 54 provided in a joint member 55 which is threaded at its upper end and engages the depending sleeve 56 of the housing 40. At its lower end the joint member 55 is also threaded and engages the sleeve 57 of the housing 58.

The cavity formed above the joint member 55 and including the area enclosed by the bore of the housing 40 and the bore of the housing 31 up to the position occupied by the ring 35 is filled with a lubricating fluid such as a soap solution. The purpose of this fluid will be explained later. It is important now to note that it is necessary to prevent this fluid from escaping into the recording sub-assembly 23. To this end, the space in the channel 54 not occupied by the piston rod 52 is sealed by means of a gasket 59 held in place by screws 60 and below the gasket is placed an O-ring 61. The piston rod 52 is by this arrangement able to move up and down in the channel 54 while still sealing the recording sub-assembly from the cavity containing the lubricating fluid above.

The piston rod 52 extends into the recording sub-assembly 23. A stylus 62 is mounted by means 63 to this piston rod. The stylus moves as the piston rod moves. The piston rod moves as the lubricating fluid sends the changes of pressure conveyed to it by expansion or contraction of the sack 33. The sack expands and contracts as the bore hole pressure changes. These changes in bore hole pressure are noted by the liquid therein which enters the opening 28 of the cap 25.

So far has been described the operation of the instrument up to the point where the stylus 62 moves in response to any change of pressure in the bore hole. To record these changes by the movement of the stylus, a recording sub-assembly 23 is provided. This sub-assembly consists of a rotating recording drum 64. This drum is supported by any convenient means for easy rotation within the housing 58. As shown, the supporting means may include the flared collar 65 at the upper end of the drum. Mounted within the drum is a strip of recording material 64a, in this case of metal texture, on which are made the marks of the stylus 62. To rotate the drum this invention provides a temperature-sensitive unit 25. In the past a clock mechanism was used. By eliminating the clock and substituting for it the present temperature-sensitive unit, the advantages over the clock mechanism previously described are obtained. To describe the operation of this unit 23, reference is now made to Figures 4, 5 and 6.

A helically wound bi-metal element 66 is mounted at its lower end to a metal cylinder 67. This metal cylinder 67 is mounted at the lower end of the housing 58 and is closed at one end 68. The element 66 is mounted to the cylinder 67 by a screw or rivet 69. This metal element is composed of two metal strips 70 and 71 mounted together in the usual thermal element fashion. Both elements have different coefficients of thermal expansion. As shown in these figures, if the temperature of the helix as occasioned by the temperature in the bore hole increases, there results a clockwise rotation of the element 72 to which the upper end of the helix is mounted by a screw or rivet 73. This element 72 is mounted for free rotation on a shaft 74. This shaft 74 extends upwardly to the drum 64 and is mounted thereto. The shaft is held in proper alignment by the drum shoulder extension 75. The shaft 74 is free to rotate on ball bearings 76 and 77 which are slip-fitted on the sleeve 78. A leaf-spring 79 mounted between a ring 80 (having notches 81 therein for the reception of tightening device and being threadedly engaged to the sleeve 78) and the bearing retaining means 82 furnishes a spring preload endwise through the bearing 76, the enlarged shaft shoulder 83, bearing 77 and a flange portion 84 of the sleeve member 78.

As was mentioned before, this drum is mounted so as to rotate only when the helix experiences an increase in temperature. To insure this action, a spring ratchet click 85 is held by rivets 86 to the sleeve member 78. This click allows the ratchet wheel 87 to rotate only in a clockwise direction. The ratchet wheel 87 is threadedly mounted to the shaft 74. When the helix realizes an increase in temperature, the element 72 to which the helix is mounted rotates in response to the rotary motion of the helix caused by the difference in coefficient of thermal expansion of the bimetal elements. When it rotates in a clockwise direction, the ratchet click 88 mounted to element 72 engages the teeth of the ratchet wheel 87 and pulls it around in a clockwise direction. The click 85 allows such a clockwise motion. The wheel 87 being mounted rigidly to the shaft 74 causes the shaft to follow this clockwise movement. The drum rotates following the shaft 74.

If, on the other hand, the temperature of the helix decreases due to a decrease in the temperature of the bore hole, the helix will rotate element 72 in a counter-clockwise direction. The click 88 will slide harmlessly over the teeth of the ratchet wheel 87 and the click 85 will insure no motion on the ratchet wheel. Consequently, the shaft 74 and the drum 64 will remain stationary during a decrease in temperature.

To review, then, the entire operation of the device, the fluid from the bore hole enters the opening 28 in the cap 25, exerts its pressure against the flexible sack 33, the sack in the case of an increase in pressure will expand, pressurizing the lubricating fluid in the cavity therebelow, the lubricating fluid exerts pressure on the exposed surfaces of the springs 49 causing the piston rod 52 to move in a downward direction, and the stylus 62 follows this movement of the piston rod 52. This makes an indication on the recording strip material 64a on the drum 64. If at the same time the temperature is increasing the expansion of the helix 66 will cause a clockwise rotation of the elements 72, the click 88 will pull the ratchet wheel 87 around, the ratchet wheel being mounted rigidly to the shaft 74 will cause this said shaft to move in a clockwise direction and the drum 64, being rigidly mounted to the shaft, will also rotate in a clockwise direction.

Referring to Figure 7, there is shown a record indication as produced by this operation. Point A represents the position of the stylus on the recording strip when the instrument is at the surface prior to lowering into the bore hole. As the capsule is lowered into the bore hole the temperature therein increases, causing the drum to rotate. Also the pressure increases. As the drum rotates and the stylus moves in response to the increase in pressure, a line indicated as B is made on the recording strip. When the capsule reaches the bottom of the bore hole it remains there for a short time. The pressure no longer increases and the stylus remains in a fixed position relative to "Reference Line." The drum, however, will continue to rotate for a short period of time due to the fact that the heat in the bore hole is dissipated not only by the bimetal element but also by the metal in the capsule itself. This causes the bimetal element to lag somewhat behind the correct temperature in the bore hole. This produces the flat portion or plateau of the curve as noted at C. The plateau at C is representative of the pressure at the point at which the capsule is stopped, in this case at the bottom of the bore hole. After allowing the capsule to rest at the bottom of the bore hole for a short while, it is raised a little above the bottom. The temperature then decreases, but the drum will not rotate in response to this decrease in temperature as previously described. The stylus will, however, note the decrease in pressure of the bore hole and will move in a straight line downwardly toward the "Reference Line." When a particular height above the bottom is reached the capsule is again allowed to rest. The position of the stylus is indicated at this point at D. After a short while the capsule is again lowered to the bottom of the bore hole. The temperature increases, causing the drum to rotate, the stylus notes an increase in pressure, and another plateau at E is recorded. The capsule rests at the bottom for a short period of time, during which time the temperature of the bimetal element catches up with the true temperature, thus causing the drum to rotate a short while to produce plateau E. The capsule is then raised to the surface and the stylus makes a line F.

It can be seen from the above description of the operation with reference to the recording strip that checks can be made on the correct pressure at the bottom of the bore hole. Also it is important to note that it is advantageous that the bimetal element does lag behind the true temperature of the bore hole, in this manner causing a plateau rather than a point at the plateaus C and E.

As previously mentioned, the instrument can be arranged to record indications of temperature in the bore hole rather than pressure. It is only necessary to cause the recording drum to be operated by the pressure-sensitive instrument and the stylus to be operated by the temperature-sensitive instrument. This is an expedient which is easily within the skill of a worker in the art from these teachings.

Also it is important to note that other pressure-responsive devices used in the prior art to move the stylus may be used. Then, too, the instrument constructed in accordance with the present invention may be used in other systems than bore hole prospecting systems where the temperature and pressure vary according to a particular scheme.

What has been shown is one embodiment of the present invention, but other embodiments obvious from the teachings herein to one skilled in the art are also contemplated to be within the spirit and scope of the appended claims.

What is claimed is:

1. In an instrument for measuring pressure in a bore hole including an elongated capsule for housing said instrument, a pressure-sensitive element, a recorder including a movable chart, means to relay indications of the pressure sensed by said pressure-sensitive element to said recorder, means to record on said chart said relayed information, a temperature-sensitive element, means connecting said temperature-sensitive element to said recorder to move said chart in one direction in response to increases in temperature sensed by said temperature-sensitive element, and means adapted to hold said chart stationary when said temperature sensitive element senses decrease in temperature.

2. In an instrument for measuring pressure in a bore hole including an elongated capsule for housing said instrument, a pressure-sensitive element, a recorder including a movable chart, means to relay indications of the pressure sensed by said pressure-sensitive element to said recorder, means to record on said chart said relayed information, a temperature-sensitive element, a ratchet wheel mounted to move said chart, a ratchet click mounted to said temperature-sensitive element and adapted to be moved thereby in response to temperature change, said click engaging said ratchet wheel and arranged to cause movement of said ratchet wheel and consequently of said chart in one direction in response to increases in temperature sensed by said temperature-sensitive element and a second ratchet click mounted to said housing, and arranged to engage said ratchet wheel to hold said ratchet wheel and consequently said chart stationary when said temperature sensitive element senses decrease in temperature.

3. An instrument as claimed in claim 1 further characterized in that the temperature-sensitive element is a helical bimetal element, said metals having different coefficients of thermal expansion.

4. An instrument as claimed in claim 1 further characterized in that the pressure-sensitive element is a piston and the temperature-sensitive element is a helical bimetal element having two metals of different coefficients of thermal expansion.

5. An instrument as claimed in claim 4 further characterized in that a flexible sack is located in said housing to receive the fluid the pressure of which is to be sensed and a soap solution occupying the space in said housing between said sack and said piston to transmit the pressure of said fluid in said sack to said piston.

References Cited in the file of this patent

UNITED STATES PATENTS

| | | |
|---|---|---|
| 1,115,302 | Fuess | Oct. 27, 1914 |
| 1,951,629 | Ross | Mar. 20, 1934 |
| 2,015,851 | Herrick et al. | Oct. 1, 1935 |
| 2,120,991 | Salnikov | June 21, 1938 |
| 2,223,786 | Hugel | Dec. 3, 1940 |
| 2,223,913 | Johnston | Dec. 3, 1940 |